2,766,208
Patented Oct. 9, 1956

2,766,208
ADDITIVE-CONTAINING MINERAL OIL COMPOSITIONS

Joseph J. McBride, Jr., Cranford, N. J., assignor to Tidewater Oil Company, a corporation of Delaware No Drawing. Application February 18, 1953,
Serial No. 337,677

7 Claims. (Cl. 252—46.7)

The present invention relates to novel oil compositions and, particularly, to lubricating oil compositions containing an additive material that imparts to the composition an improved property or combination of properties.

The compositions embodied herein comprise a mineral oil fraction in major amount based upon the weight of the composition and a minor amount, sufficient to improve said composition with respect to a desired property or combination of properties, of an oil-soluble phosphorus-, nitrogen-, and sulfur-containing material as described more fully hereinafter. With reference to the mineral oil component, usage is contemplated of mineral oil fractions of refined or unrefined types that may vary over a rather wide range with respect to viscosity, viscosity index and other characteristics and to which fractions it is desired to impart improved properties with respect to load-carrying capacity and/or anti-oxidation characteristics. Illustrative embodiments relate to use of mineral oil fractions useful as cutting oils in metal cutting operations, as lubricants for internal combustion engines, turbines, and the like.

The material incorporated in the compositions embodied herein for imparting improved properties thereto is an oil-soluble product formed by addition reaction of an esterified dithiophosphoric acid with a nitrile of propenoic acid or a substituted propenoic acid. The esterified dithiophosphoric acids contemplated for such use as a component of said addition product may be illustrated by the following structural formula:

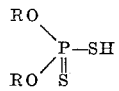

wherein R is a hydrocarbon group that provides, when subjected to addition reaction with a nitrile as defined hereinafter, an addition product that is sufficiently soluble in mineral oils in amounts that impart the desired improvement thereto. Thus, R may represent hydrocarbon groups such as aryl, aralkyl, alkaryl, and alkyl, or the like, and mixtures thereof. Preferably, R represents an alkyl group of a relatively high content of carbon atoms, e. g. from about four to about eighteen carbon atoms. Specific illustrations include heptyl, octyl, 2-ethylhexyl, lauryl and the like.

As aforesaid, the other component of the addition reaction product is a nitrile of a propenoic acid. Of such nitriles, acrylonitrile is particularly suitable for practice of this invention and represents a preferred embodiment. However, the invention may be practiced with nitriles of substituted propenoic acids, inclusive of homologs of propenoic acid, and which may be illustrated by crotonic acid. Also contemplated for use are nitriles of other substituted propenoic acids, and illustrative of which is the nitrile of methacrylic acid.

Suitable reaction conditions for preparation of the addition products used herein comprise heating the reactants, using a mol to mol ratio or an excess of the nitrile, at an elevated temperature, e. g. about 65° C. or higher, for about one-quarter hour to about five hours. The reaction that occurs is exothermic with production of a reaction product that is substantially neutral or of substantially lower neutralization value than the dithiophosphoric acid ester used as a reactant with the neutral nitriles.

In such a manner, addition products may be prepared by reacting the stated nitriles, such as acrylonitrile, crotononitrile, and the like, the esterified dithiophosphoric acids such as O,O-di-2-ethylhexyldithiophosphoric acid, O,O - dioctyldithiophosphoric acid, O,O - dilauryldithiophosphoric acid, and the like. For purposes of illustration and not limitation, reaction between acrylonitrile or crotononitrile (neutral substances) and O,O-di-2-ethylhexyldithiophosphoric acid (neutralization No. of 147.5) by the aforesaid method of preparation, produces viscous, pale-yellow substantially neutral addition products readily soluble in a solvent (furfural) refined mineral oil of SAE 30 grade and in low viscosity oils (e. g. 100 SUS at 100° F.) such as used for preparation of cutting oils for metal-cutting operations.

In accordance with an embodiment of this invention, mineral oil compositions may be prepared that possess improved characteristics with respect to load-carrying capacity. In illustration thereof, a composition was prepared comprising 90 per cent by weight of a mineral oil having a viscosity of 100 SUS at 100° F. (e. g. 100 pale oil) and 10 percent by weight of the aforesaid product of addition reaction between acrylonitrile and O,O-di-2-ethylhexyldithiophosphoric acid. The composition was subjected to test in a Falex tester to determine the load-carrying properties thereof. The Falex tester, as is well-known to those skilled in the art, is a lubricant testing machine comprising a steel pin rotatable between two non-rotatable steel jaws carrying V-shaped bearing surfaces, and means for clamping the rotating pin between the bearing surfaces with adjustable force. In conducting the test, the composition under test is kept in contact with the revolving pin while the latter is clamped beween the bearings with steadily increasing force applied to the jaws. The amount of force, as indicated on the load gauge of the machine, required to cause seizure between pin and bearings represents failure of the oil by this test. When subjected to such a test, the mineral oil itself (devoid of the nitrile addition product embodied herein) failed before a load of 500 (lbs.-gauge) was applied to the machine whereas the same oil containing the aforesaid addition product carried a load of between 1500 and 1750 (lbs.-gauge) with a torque reading of about 28 (lbs.-inches).

In another embodiment of the invention, mineral oil compositions may be prepared that are improved with respect to resistance to oxidation. In illustration thereof, a composition was prepared by dissolving, in a solvent refined mineral oil of turbine lubricating grade, one-quarter of one percent by weight of the aforesaid product of addition between acrylonitrile and O,O-di-2-ethylhexyl-dithiophosphoric acid. The composition was subjected to test in accordance with the test method entitled "Oxidation Characteristics of Inhibited Steam-Turbine Oils," ASTM Designation: D943–47T, as set forth starting on page 415 of "ASTM Standards on Petroleum Products and Lubricants," issued September 1951, and published by the American Society For Testing Materials. Utilizing said test procedure on the basis of comparison between the time required for the aforesaid test composition and the oil itself (devoid of the inhibitor) to attain a neutralization value of 2.0 (mg. of KOH/gram of oil), the oil itself and an oxidation inhibited life of 24–48 hours whereas the aforesaid test composition had a substantially extended life of 260 hours.

As is apparent from the foregoing, compositions as embodied herein may be prepared that possess, depending upon the amount of the described additive employed, improved properties with respect to load-carrying capacity, resistance to oxidation, or both. For imparting improved oxidation resistance, only relatively small amounts of the inhibitor are usually required as shown by the substantial improvement obtained by use of one-quarter of one percent by weight of additive in the foregoing illustration. On the other hand, when it is also desired to substantially improve the load-carrying capacity of the oil, larger amounts of additive are usually required than is necessary solely for substantially improving the resistance of the oil against oxidation. Thus, in broad aspect, the invention relates to compositions comprising a mineral oil, in major amount based on the weight of the composition, and the additive material in an amount ranging from that sufficient to substantially inhibit the composition against oxidation to an amount that substantially improves the load-carrying capacity of the composition. In a specific embodiment, the invention relates to compositions comprising a mineral oil in the amount of at least about 90 percent by weight of the composition and an amount of additive material to impart thereto improved resistance to oxidation, or improved load-carrying capacity, or both. For most purposes, and for substantially improving the resistance of the oil against oxidation, an amount of additive of from about 0.1 to 3.0 percent may usually be employed, whereas for obtaining such an improvement along with a substantial improvement in load-carrying capacity, an amount of additive material in excess of about 3 percent, as for example up to about 10–20 percent by weight of the composition may be employed.

Although the present invention has been described in conjunction with certain preferred embodiments thereof, those skilled in the art will readily recognize that variations and modifications can be made. Such modifications and variations are to be considered to be within the purview of the specification and scope of the appended claims. Moreover, it should be understood that compositions, as embodied herein, may also contain additional ingredients for imparting other desired properties to the compositions. In illustration, the compositions may contain anti-foam agents, e. g. of the silicone type, viscosity index improvers, e. g. polyacrylates, and the like.

I claim:

1. A liquid composition consisting essentially of a mineral oil of lubricating grade in major amount based upon the weight of the composition and having dissolved therein an oil-soluble addition product of a compound of the formula

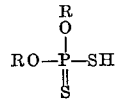

wherein R is an alkyl group of about 4 to about 18 carbon atoms and a nitrile of an acid from the group consisting of propenoic acid and methyl-substituted propenoic acid, said oil-soluble product being present in said composition in an amount ranging from that sufficient to substantially inhibit the composition against oxidation to an amount that substantially increases the load-carrying capacity of said composition.

2. A composition, as defined in claim 1, wherein R is 2-ethylhexyl.

3. A composition, as defined in claim 1, wherein the nitrile is acrylonitrile.

4. A liquid composition consisting essentially of a mineral oil of lubricating grade in major amount based on the weight of said composition and having dissolved therein an oil-soluble addition product of O,O-di-2-ethylhexyldithiophosphoric acid and a nitrile from the group consisting of acrylonitrile and crotononitrile, said oil-soluble product being present in said composition in an amount ranging from about 0.1 to about 3.0 percent by weight, sufficient to substantially inhibit the composition against oxidation, to an amount in excess of about 3.0 percent and up to about 20 percent by weight, sufficient to substantially increase the load-carrying capacity of said composition.

5. A liquid composition consisting essentially of a mineral oil of lubricating grade in major amount based upon the weight of the composition and having dissolved therein from about one-quarter of one percent to about 20 percent by weight of an oil-soluble addition product of a compound of the formula

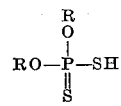

wherein R is an alkyl group of from 4 to 18 carbon atoms and a nitrile of an acid from the group consisting of propenoic acid and methyl-substituted propenoic acid.

6. A composition consisting essentially of a mineral oil of lubricating grade in major amount based upon the weight of the composition having dissolved therein from about 0.1 to about 3.0 percent by weight, sufficient to impart oxidation-inhibiting properties to said oil, of an oil-soluble addition product of a compound of the formula

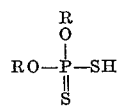

wherein R is an alkyl group of from about four to about eighteen carbon atoms and a nitrile of an acid from the group consisting of propenoic acid and methyl-substituted propenoic acid.

7. A composition consisting essentially of a mineral oil of lubricating grade in major amount based upon the weight of the composition having dissolved therein an amount in excess of about 3.0 percent and up to about 20 percent by weight, sufficient to increase the load-carrying properties of said oil, of an oil-soluble addition product of a compound of the formula

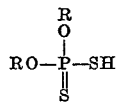

wherein R is an alkyl group of from about four to about eighteen carbon atoms and a nitrile from the group consisting of propenoic acid and methyl-substituted propenoic acid.

References Cited in the file of this patent

UNITED STATES PATENTS 2,494,284      Cassaday et al. _____ Jan. 10, 1950